INVENTOR.
RICHARD BAVERSTOCK

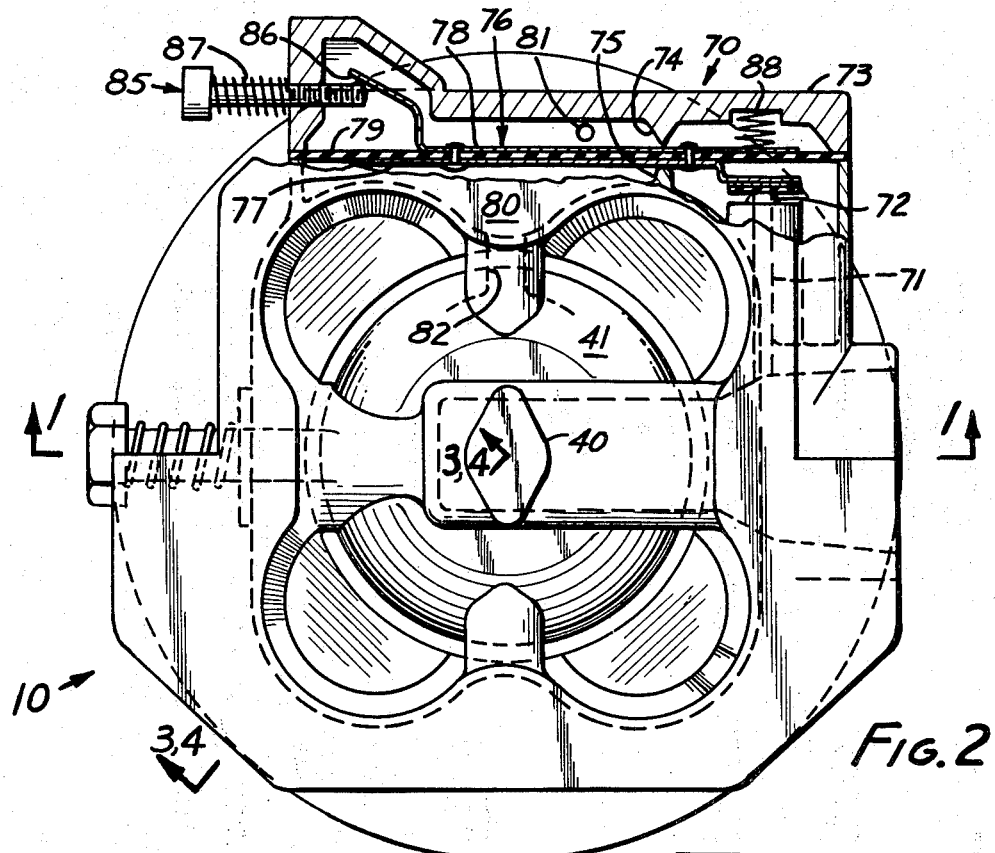
Fig. 2
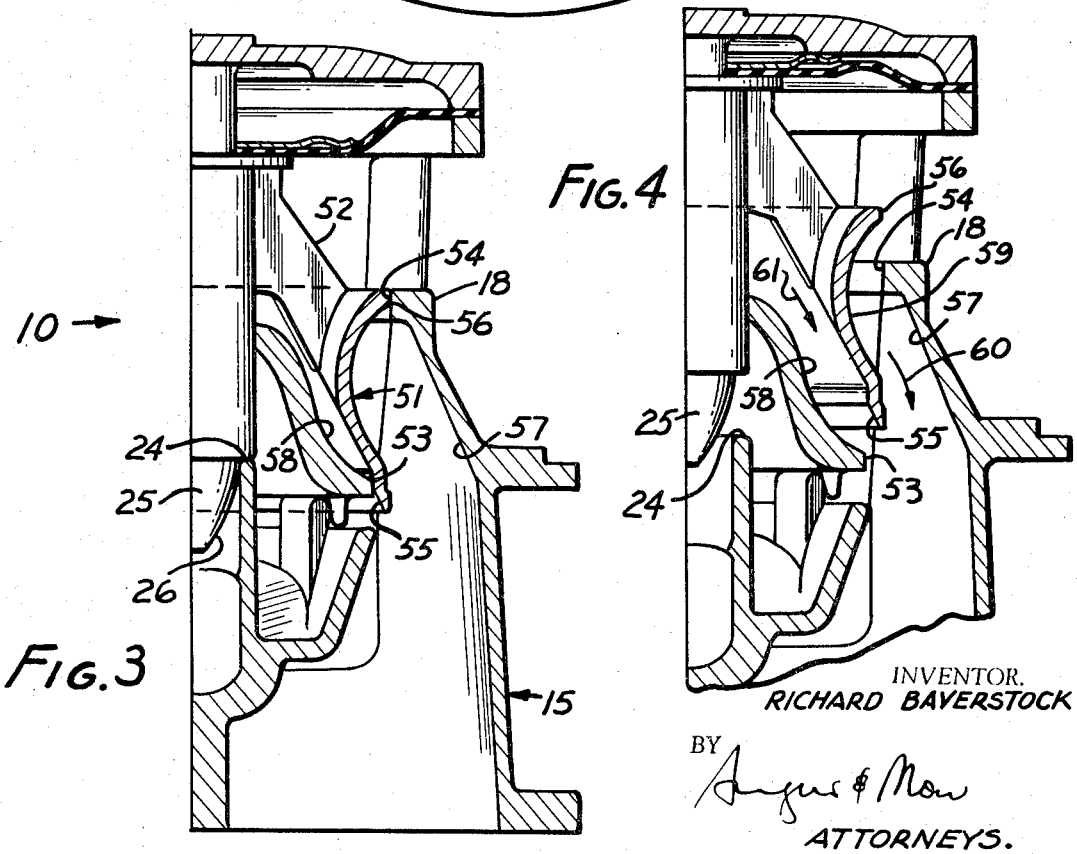
Fig. 3
Fig. 4
INVENTOR.
RICHARD BAVERSTOCK
BY
ATTORNEYS.

United States Patent Office 3,545,948
Patented Dec. 8, 1970

3,545,948
APPARATUS FOR CARBURETION OF GASEOUS
FUELS AND AIR
Richard Baverstock, Long Beach, Calif., assignor to Imperial Machine Products Company, South Gate, Calif., a corporation of California
Filed Sept. 27, 1967, Ser. No. 670,955
Int. Cl. F02m 21/04, 3/00, 17/08
U.S. Cl. 48—184                                  17 Claims

ABSTRACT OF THE DISCLOSURE

A mixing unit for providing a combustible mixture, and has two principal features, one of which is an idling adjustment which enables the mixture to be readily trimmed at low flow rates, so as to provide an efficiently operating device with a minimum of critical dimensions. Another feature resides in an air valve which requires markedly less force and energy to operate the same, and which is resistant to backfires. This air valve includes a pair of axially spaced-apart sets of valve seats, two of which are stationary and two of which are movable, whereby the length of axial motion of the valving element is significantly reduced. The mixing unit comprises a housing having a central axis, a peripheral air inlet and a mixture discharge passage downstream of the air inlet with a direction of outlet flow. A fuel inlet conduit terminates inside the housing at a fuel valve seat. An axially shiftable fuel valve head makes a closed operative seal with the fuel inlet. Conduit by bearing on the fuel valve seat in a first position and opens the fuel inlet conduit by moving off the fuel valve seat to a second position axially spaced from the first. A spring axially biases the valve head toward the first position. An actuator moves the fuel valve head to the second position as a function of downstream pressure and flow conditions downstream of the mixing unit. The air valve is positioned between the air inlet and mixture discharge passage. The air valve comprises a pair of peripheral continuous coaxial, axially spaced-apart and axially centered stationary valve seats in the housing. Both of the valve seats are downstream from the air inlet. A ring-shaped impermeable axially centered valve element is mounted to the fuel valve head and axially movable therewith relative to the stationary air valve seats. A pair of movable air valve seats is carried by the element which are axially spaced apart from each other by the same spacing as the air valve seats making operative seals in pairs with the stationary air valve seats when the fuel valve head is in its first position. The movable air valve seats stand axially spaced from the respective stationary air valve seats when the fuel valve head is in its second position so as to leave two annular openings from the air inlet to the mixture discharge passage between separated sets of air valve seats. A peripheral recessed wall on the valve element clears the upstream one of the stationary valve seats when the fuel valve head is in the second position. Fuel from the fuel valve seat discharges into the airstream downstream from both of the valve seats. The idle adjustment comprises an idle supply passage in communication with the fuel inlet conduit, an idle valve seat at an end of the idle supply passage and an idle valve closure to open and close the idle valve seat. A pivotal member consisting of backing plates and a diaphragm mounts the idle valve closure. The diaphragm is movable in response to pressure in the mixture conduit and at relative low air flow corresponding to relatively low down stream demand opening the idle supply passage to provide a source of fuel supplementary to that provided by the fuel inlet conduit past the fuel valve.

---

This invention relates to the carburetion of gaseous fuels and air. The term "gaseous fuels" comprehends fuels which are in the gaseous state at the temperature prevailing in carburetion in the atmosphere. Such fuels include natural gas and liquefied petroleum gas which has been converted to the gaseous state, as two examples.

Objects of this invention are to provide an improved mixing unit with the function of metering fuel into an airstream at a predetermined fuel-air ratio, with the following objectives:

(a) To require a minimum amount of pressure differential and energy for its actuation, thereby to render the mixing unit more responsive to engine conditions, (b) To reduce the travel required for valving elements, thereby to reduce the envelope dimensions, (c) To provide means for trimming the fuel supply at idling speeds with a minimum of critical dimensions required in order properly to meter the fuel at idling speeds, (d) To provide a positive fuel shutoff at the mixing unit, thereby enabling the device to switch directly among a plurality of different fuels which may be supplied at different pressures to compensate for their different B.t.u. ratings, and (e) To provide a mixing device which is more resistant to backfires than conventional diaphragm type mixing devices.

With the air valve which is provided in this device, the area of the valving element exposed to differential pressure is greatly reduced compared to normal carburetor arrangements, thereby reducing the force and power requirements for actuation, and reducing are area exposed to backfire pressure. Furthermore, the axial movement of the valving element is reduced to about one-half of conventional requirements, thereby reducing the envelope height of the device. The air valve is furthermore ideally adapted to include air flow surfaces which reduce pressure loss in the air stream, and which deflect backfire gas flows.

The idle adjustment is elegantly simple and includes a fuel by-pass to the mixing device responsive to conditions in a mixture discharge passage which in turn is responsive to conditions in an engine intake manifold, whereby the idle adjustment is effective at the time of starting and at idling speeds, and is readily trimmed.

A mixing device according to this invention includes a housing having an air inlet and a mixture discharge passage with an outlet direction of flow which may for example proceed past a butterfly valve to an engine intake manifold, or to a burner of some kind. A fuel inlet conduit terminates inside the housing at a fuel valve seat. A fuel valve head is adapted to make an operative seal at the fuel inlet conduit by bearing on the fuel valve seat in a first position and opens the said fuel inlet conduit by moving off said seat to a second position. Bias means urges the valve head toward the first position, and actuator means is adapted to move the fuel head toward the second position.

An air valve is provided between the air inlet and the mixture discharge passage, the air valve comprising a pair of peripheral continuous co-axial axially spaced-apart stationary air valve seats in the housing, together with a ring-shaped impermeable valve element which is axially movable relative to the stationary air valve seats. A pair of movable air valve seats is carried by the element, which movable seats are axially spaced apart from each other by the same spacings as said stationary air valve seats and which are adapted to make operative sealing contact in pairs with the stationary air valve seats when the fuel valve head is in its first position and to stand axially spaced from the respective stationary air valve seats when the fuel valve head is in its second position, thereby to leave two annular openings from the air inlet to the mixture discharge passage between separated sets of air valve seats.

The terms "operative seal" and "operative sealing contact" are used herein to denote a closure which is integral as required for the intended function. In the air valve, the seal need not be hermetically tight. Some air leakage is permissible, so long as it is not enough to enable the engine to run. Thus, as to the air valve, an "operative seal" need only be tight enough to prevent engine operation when closed, although it could be tighter if desired. In the fuel valve, however, the term "operative seal" denotes a fluid-tight seal, because fuel leakage cannot be tolerated.

A peripheral recessed wall on the valve element is so disposed and shaped as to clear the upstream one of the stationary valve seats when the fuel valve head is in the second position. Fuel from the fuel valve seat discharges on the downstream side of the air valve.

According to a preferred but optional feature of this invention, the housing includes a central core into which the fuel from the fuel inlet conduit discharges past the fuel valve seat, the core forming an impermeable barrier against fuel flow to the air inlet and discharge fuel into the mixture discharge passage on the downstream side of the air valve.

According to another preferred but optional feature of the invention, the mixing unit includes an idle adjustment which has an idle fuel supply passage in communication with the fuel inlet conduit with an idle valve seat at an end of said idle supply passage. An idle valve closure is adapted to open and close said idle valve and is pivotally mounted to the housing. Pressure-actuated means is responsive to pressure in the mixture discharge passage for the purpose of opening and closing said idle valve seat. It opens at a lower differential pressure than does the main fuel valve, and provides in a bypass manner a supplemental adjusted supply of fuel at idle speeds. It is open at all speeds, but its proportional supply is, of course, relatively small at speeds above idling.

The above and other features of this invention will be fully understood from the following detailed description and the accompanying drawings, in which:

FIG. 2 is a cross-section taken at line 2—2 of FIG. 1; and

FIGS. 3 and 4 are fragmentary views taken at lines 3—3, 4—4 of FIG. 2, showing a portion of the device of FIG. 1 in a first and a second position, respectively.

Figure 1:
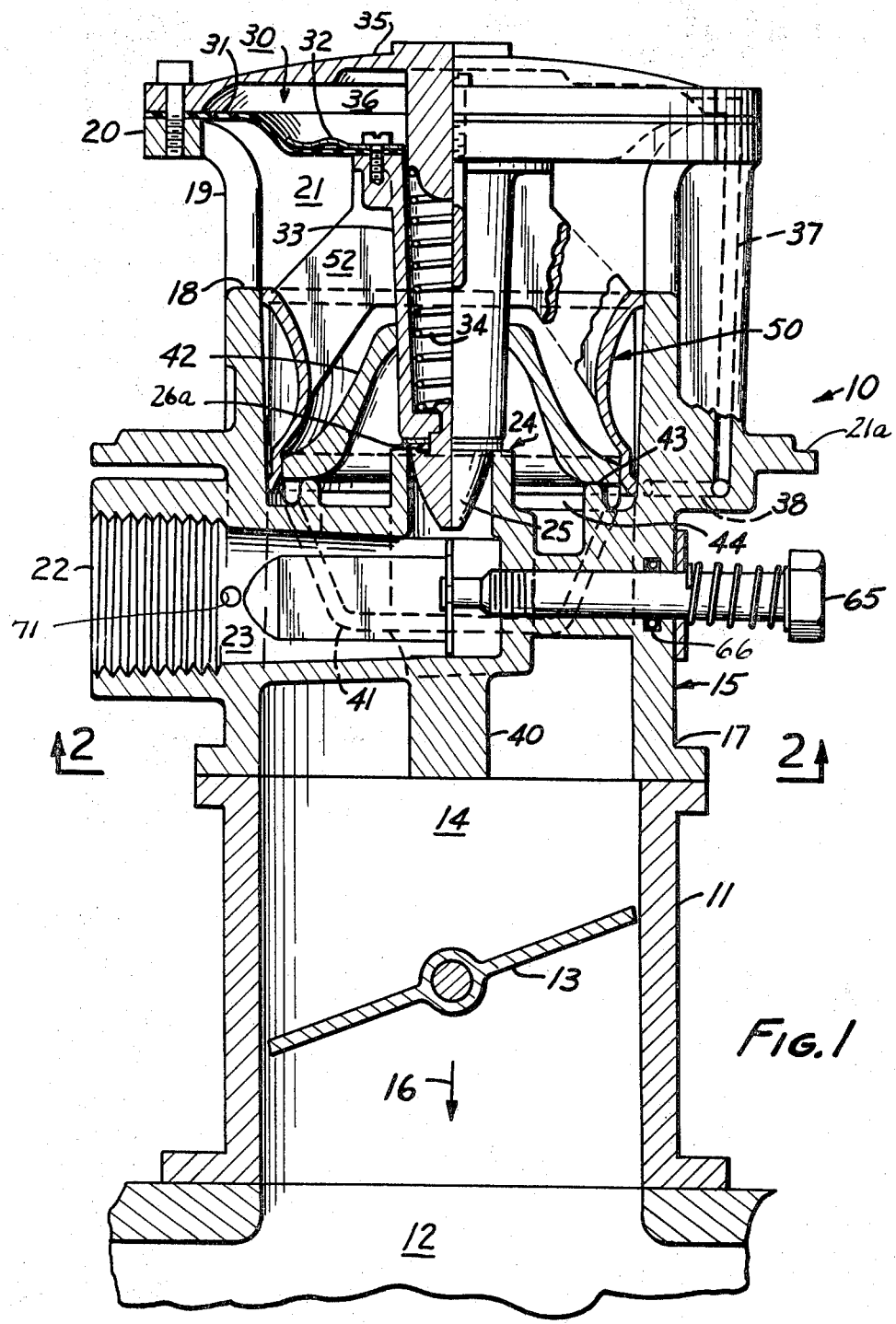
FIG. 1 is an axial cross-section of the presently preferred embodiment of the invention, shown in a carburetor.

A mixing unit 10 according to the invention is shown mounted by an adapter 11 to an engine intake manifold 12. A conventional butterfly-type throttle valve 13 is pivotally mounted to the adapter and serves to regulate the rate of flow through a mixture discharge passage 14 at the bottom of housing 15. The mixing device, with a butterfly valve, constitutes a carburetor. Arrow 16 indicates the axis of outlet flow from the mixing unit toward the engine intake manifold. It will readily be seen that the pressure in the mixture discharge passage is a function of the pressure in the engine intake manifold, although it is not usually identical thereto while the engine is in operation. However, throughout the specification, pressures in the mixture discharge passage will be regarded as a function of the engine intake manifold in accordance with well-understood principles of carburetor operation when engine carburetion is the subject.

The housing includes a base portion 17 which rises to a flange 18. A plurality of posts 19 rise from flange 18 and support a peripheral ring 20 at their upper ends. The posts are spaced apart and leave a substantially annular air inlet 21 between them. Air is therefore able to penetrate to pass to the inside of the flange without impediment other than from the four posts which constitute only a relatively small restriction. A cap (not shown) can be placed over the air inlet and mounted to flange 21a for supercharged installations. Then the supercharged pressure is exerted inside the region defined by the posts.

A fuel inlet port 22 is formed at the side wall of base portion 17, and is in fluid connection with a fuel inlet conduit 23, which fuel inlet conduit extends to the central portion of the generally symmetrical mixing unit where it terminates in an upwardly-facing fuel valve seat 24. The fuel valve seat is a circular annular structure adapted to be opened or closed by a fuel valve head 25. The fuel valve head has a tapered tip 26, and it will be noted that a metering action is obtained by its structure as a function of its axial position relative to the fuel valve seat. The valve head, if desired, carries a soft annular seal 26a to ensure effective closure in the first closed position shown in FIGS. 1 and 3. The second open position is shown in FIG. 4. The condition of FIGS. 1 and 3 illustrate a fluid-tight (operative) seal for the fuel supply.

Referring again to FIG. 1, the valve head is operated by actuator means 30, which actuator means conveniently comprises a fluid motor. This motor comprises a flexible diaphragm 31 with a central backing plate 32 which is bolted to a plunger 33, which plunger supports at its lower end the fuel valve head. The plunger is shown somewhat tapered in the drawings, but this only shows the draft on a cast part. Actually, the plunger is substantially cylindrical. Air supply pressure—either atmospheric or supercharged—is exerted on the bottom of this diaphragm in FIG. 1.

Bias means 34 comprising a coil spring is backed against a cap 35 and opposes the plunger at the lower end thereof. The cap makes a full peripheral seal with ring 20 and forms an actuator chamber 36 above the diaphragm. It will be seen that the spring tends to press the valve head toward its closed position, and that a vacuum or other pressure less than air supply pressures exerted in the actuator chamber will tend to lift the valve head and plunger against the force of the spring. For this purpose, a power passage 37 is formed through one of the posts and extends sidewardly through a branch 38 to connect to the mixture discharge passage.

Branch 38 opens into the mixture passage at a reduced region of rapid air flow just below an air valve yet to be described, near the upper end of the mixture discharge passage. The pressure at this point is, of course, a function of the air supply pressure (ambient or supercharged), of the velocity of the air past the opening to branch 38, and, in the embodiment illustrated, also of the setting of the throttle valve, and of the engine speed and load. These relate both to downstream pressures, and to the rate of flow in the manifold (and thereby through the mixing unit). Conveniently restated, branch 38 receives a pressure which is a function of downstream conditions as to pressure and flow rate, and of upstream pressures. The air passage is narrower here, and the pressure is reduced because of the mass flow in a generally known manner.

The housing also includes a central core 40 which includes a lower bowl 41 and an upper cap 42, the bowl and cap being impermeable structures, and the fuel valve seat rising centrally therein. A group of spacers 43 holds the bowl and cap apart to provide a series of openings 44 through which fuel escapes from the core into the mixture discharge passage. The plunger passes through the cap 42 and shifts along its axis in an opening in the cap.

An air valve 50 is disposed upstream of the openings 44. The air valve includes a valve element 51 which is a continuous ring connected by a plurality of webs 52 to the plunger so that valve element 51 moves up and down with the plunger. The air valve includes a pair of stationary air valve seats 53 and 54. Seat 53 is sometimes referred to as the downstream, and seat 54 as the upstream seat. These two seats are disposed on stationary housing structure, seat 53 being disposed on cap 42 of the core, and seat 54 being disposed on the flange 18. It will be noted that there is only a relatively small difference between their diameters, and that this difference is the active area which is exposed to differential pressures and that is exposed to backfire pressures, or pressures which must be overcome to operate the device.

A pair of movable air valve seats 55, 56 is adapted to move toward and away from valve seats 53 and 54, respectively, so as to make an operative seal in respective pairs in the first position shown in FIGS. 1 and 3, and to be spaced apart from each other to permit air flow in a second position as shown in FIG. 4. Therefore, seats 55 and 56 are axially spaced apart from each other by the same distance as seats 53 and 54. The actual construction of the seats and of the remaining portions of the air valve and its surfaces and passages are best shown in FIGS. 3 and 4 because of the more advantageous section lines chosen for their illustration.

One and preferably both of the stationary seats has adjacent to it a wall which diverges therefrom. For example, the housing includes a surface 57 which diverges outwardly from seat 54 as it extends downwardly. Also, cap 42 has a wall 58 which converges toward the center as it extends axially away from seat 53. Both sets of surfaces are not required, although they are convenient in providing optimum air flow with a minimum energy loss as the air passes through the air valve. However, at least one of these surfaces must be provided and it preferably will be surface 57 in order that it can cooperate with a peripheral recessed wall 59 carried by the valve element. The advantage of wall 59 can best be seen in FIG. 4, which illustrates the open position of the valve, and it will be noted that in this position a first air passage 60 is formed between wall 59 and seat 54 and a second air passage 61 is formed between seat 53 and the inner wall of the valve element. This latter wall also can be contoured for most effective air flow.

It will further be noted that the differences between the diameters of the seats are not great and that therefore the differential pressure that must be overcome in order to actuate the valve is lower than in typical mixing units wherein a large, stopper-type air valve is used. For this reason, very large air flows can be accommodated with diaphragms having a diameter on the order of only 3 or 4 inches. Furthermore, it will be noted that a substantially complete opening is provided when the axial motion of the valve element is only about half its length. A travel of at least twice this length would be necessary to get the same flow characteristics in conventional air valves. For this reason, less total energy and less time are required to open the valve. Therefore, the valve is more responsive to small pressure changes and its response time is greatly decreased compared to conventional constructions.

Still another advantage of wall 59 can be appreciated by refering to FIG. 4 and considering the effect of the sudden upward blast of a backfire. In conventional mixing units these can often be destructive of the diaphragms even when protective back-up rings and the like are provided, because the hot gases themselves may deleteriously affect the material of the diaphragm.

In this device, bowl 41 deflects the gases to flow channel 60, and wall 59 deflects them sidewardly out the air inlet, and keeps them entirely away from the diaphragm. In addition, mechanical shock is minimized because of the small unbalanced area of valve element 51.

An adjustment screw 65 is provided for making a gross adjustment to the fuel flow through the mixing unit. An O-ring 66 makes a seal around its shaft.

As can best be seen by reference to both FIGS. 1 and 2, an idle adjustment 70 is provided which has as its purpose the trimming of fuel supply at starting and idling speeds where the valve head is substantially or almost completely closed and were some alternate fuel supply not provided, then very close tolerances would have to be provided in order that the device could properly meter the mixture. It is an advantage of this invention that with positive fuel shutoff the air valve can be permitted to be somewhat leaky, thereby lessening requirements for close tolerances. However, these lesser tolerances then call for means whereby the fuel supply at starting and idle speeds may be trimmed. This device accomplishes that purpose, and improves the starting and idle speed operation of the engine. Flow through this by-pass is not enough to operate the engine, but it can be made large enough to overcome any shortcomings resulting from the relative dimensions of the air valve as related to the fuel valve. Therefore, the mixing unit can be manufactured at minimum cost, and still produce optimum functions.

In FIG. 1 an idle supply passage 71 is shown departing from the fuel inlet conduit 23. This idle supply passage is again found in FIG. 2 extending to an idle valve seat 72 which stands inside a chamber formed by a cover 73 that is mounted to the housing by means such as screws. A fulcrum 74 is formed on the inside of the cover. A plurality of studs 75 which are spaced apart from each other so as to permit gas flow past them is formed inside the cover, but on the housing. Pivotal means 76 comprises a pair of backing plates 77, 78 which hold between them a diaphragm 79 which makes a full sealing peripheral contact with the cover so as to form a fluid-tight region 80 on the side of the diaphragm which faces the idle valve seat. The cover may be pierced by a vent 81 which is connected to air supply pressure, or this vent may be directed to the top of flange 21a so as to open inside the supercharged air supply, or simply to atmosphere, depending on the air supply to be used. Port 82 extends from region 80 into the core, which in turn is connected by opening 44 to the mixture discharge passage. Therefore the diaphragm is exposed on one side to the pressure in the mixture discharge passage (or at least to pressure which is a function of that in said passage) and on the other side to air supply pressure, which may be ambient or supercharged.

Idle valve seat 72 is carried by backing plate 77 and 78 and it will be seen that the pivotal means can rock on the fulcrum so as to open or close the idle supply passage at the idle valve seat. Adjustment means 85 comprises an abutment surface 86 which forms part of backing plate 78 and assumes a tapering form relative to a limit stop 87 in the form of a screw which can be moved axially relative to the abutment means so as to limit the amount of counterclockwise pivotal motion as seen in FIG. 2. The farther to the right the limit stop is moved, the less total opening is possible at the idle valve closure. Therefore, when pressure drops in the mixture discharge passage, the lefthand side of the pivotal means will be pulled down in FIG. 2 and the idle supply passage will be open to the extent permitted by the adjustment means. When the engine is stopped, or in other installations where there is not sufficient differential pressure across the diaphragm, then bias spring 88 will close the idle valve closure. It will be noted that at all times the engine is operating, or there is the said sufficient differential, the idle adjustment operates as an adjusted, fully opened by-pass fuel supply to the mixture discharge passage.

The operation of the mixing unit itself, and of the carburetor assembly, should be evident from the foregoing.

With fuel pressure on in the fuel inlet, and with the mixing unit connected to the engine intake manifold, the engine will be cracked over with the throttle open and the pressure in the mixture discharge passage will drop. This exerts a negative pressure in the chamber of actuator means 30, which in turn will cause the plunger to rise and the valve head to rise in FIG. 1, and fuel will thereby be supplied through the core to the mixture discharge passage. At the same time, the air valve will open by movement to the position of FIG. 4 so that air passes downwardly past the openings 44 where fuel is fed into the airstream, and the mixture proceeds to the engine. It will be understood that depending on the pressure in the mixture discharge passage which in turn is a function of the air flow and also of the pressure in the engine intake manifold, the valve element in the air valve can assume any number of intermediate positions, as can the valve head (all being collectively referred to as a "second" or "open" position), whereby an appropriate mixture for the speed of the engine is provided. The valve head and also the shape of the valve member in the air valve may be sculptured to form the optimum orifices for the conditions involved.

When the engine stops, the entire system returns to atmospheric pressure, the bias means 34 closes the fuel valve and bias means 88 closes the idle valve. At starting and idling speeds the fuel supply is largely provided by the idle adjustment because of the low airflow rate. The idle valve closure will be opened by the differential pressure across its diaphragm, and is set to open before the main fuel valve opens. The fuel flow in this instance will be from the idle supply passage past the idle valve seat, past studs 75 and through port 82 to the core and thence into the mixture discharge passage. This trims up the starting and idling performance.

The foregoing mixing unit is of optimally small envelope configuration; involves minimum pressure drops, minimum forces and energy for operation, smooth, readily adjustable operation at idling speeds, and adaptability to the use of a wide range of fuels.

This invention is not to be limited by the embodiment shown in the drawings and described in the description which is given by way of example and not of limitation, but only in accordance with the scope of the appended claims.

I claim:

1. A mixing unit comprising: a housing having a central axis, a peripheral air inlet, and a mixture discharge passage downstream of said air inlet with a direction of outlet flow; a fuel inlet conduit terminating inside the housing at a fuel valve seat, an axially shiftable fuel valve head adapted to make a closed operative seal with the fuel inlet conduit by bearing on the fuel valve seat in a first position, and to open said fuel inlet conduit by moving off said fuel valve seat to a second position axially spaced from the first; bias means axially urging the valve head toward said first postion; actuator means adapted to move the fuel valve head to said second position as a function of downstream pressure and flow conditions downstream from the mixing unit; and an air valve between the air inlet and the mixture discharge passage, said air valve comprising a pair of peripheral continuous coaxial, axially spaced-apart and axially centered stationary air valve seats in said housing, both of said air valve seats being downstream from the air inlet, a ring-shaped impermeable axially centered valve element mounted to said fuel valve head and axially movable therewith relative to said stationary air valve seats, a pair of movable air valve seats carried by said element which are axially spaced apart from each other by the same spacing as said stationary air valve seats making operative seals in pairs with said stationary air valve seats when the fuel valve head is in its first position, and standing axially spaced from the respective stationary air valve seats when the fuel valve head is in its second position so as to leave two annular openings from the air inlet to the mixture discharge passage between separated sets of air valve seats, a peripheral recessed wall on said valve element clearing the upstream one of said stationary valve seats when the fuel valve head is in said second position, fuel from the fuel valve seat discharging into the airstream downstream from both of said valve seats.

2. A mixing unit according to claim 1 in which the housing includes a stationary core, the core bearing the downstream and radially innermost one of said stationary air valve seats and having a surface facing the air inlet and extending toward the center as it extends toward the air inlet.

3. A mixing unit according to claim 1 including a butterfly valve in the mixture discharge passage downstream of the fuel discharge, thereby forming a carburetor.

4. A mixing unit according to claim 1 in which the housing includes a core into which the fuel from the fuel inlet conduit discharges past the fuel valve seat, the core forming an impermeable barrier against fuel flow to the air inlet, and discharging into the mixture discharge passage on the downstream side of said air valve, the core also having an upwardly and outwardly flaring bowl to deflect reverse flow outwardly from the central axis.

5. A mixing unit according to claim 1 in which the actuator means comprises a fluid motor, and in which a power passage interconnects the mixture discharge passage to the fluid motor whereby the position of the fuel valve head and of the valve element are responsive to pressure in the mixture discharge passage.

6. A mixing unit according to claim 1 in which the housing includes a core, the core bearing the downstream one of said stationary air valve seats and having a surface facing the air inlet and extending toward the center as it extends away from the said downstream stationary air valve seat toward the air inlet, in which the housing includes a surface which faces the mixture discharge passage and extends outwardly while it extends away from the upstream stationary air valve seat.

7. A mixing unit according to claim 6 in which the actuator comprises a diaphragm, one side of which is exposed to air supply pressure, and the other side of which is exposed to pressure in the mixture discharge passage and in which a plunger is mounted to said diaphragm and passes into said core, the fuel valve head being mounted to said plunger, the valve element being mounted to and shiftable with the plunger.

8. A mixing unit according to claim 1 in which there is provided an idle adjustment comprising: an idle supply passage in communication with the fuel inlet conduit, an idle valve seat at an end of the said idle supply passage; an idle valve closure adapted to open and to close said idle valve seat; pivotal means mounting said idle valve closure; and pressure-actuated means for moving said pivotal means in response to pressure in said mixture discharge passage, pressure responsive actuated means including means at relatively low air flow corresponding to relatively low downstream demand opening said idle supply passage to provide a source of fuel supplementary to that provided by the fuel inlet conduit past the fuel valve.

9. A mixing unit according to claim 8 in which adjustment means adjustably limits the maximum opening between the idle valve seat and the idle valve closure.

10. Apparatus according to claim 9 in which the pressure-actuated means comprises a diaphragm exposed on one side to air supply pressure and on the other side to pressure in the mixture discharge passage, and in which the adjustment means comprises a movable limit stop on the housing, and an abutment means carried by the pivot means to limit the travel of the idle valve closure toward the open position.

11. A mixing unit according to claim 1 in which the peripheral recessed wall is a surface of revolution, the upstream portion of which curves radially outwardly as it extends in an upstream direction so as to divert sidewardly reverse-flowing backfire gases, thereby to protect the actuator means.

12. A mixing unit according to claim 11 in which the housing includes a core into which the fuel from the fuel inlet conduit discharges past the fuel valve seat, the core forming an impermeable barrier against fuel flow to the air inlet, and discharging into the mixture discharge passage on the downstream side of said air valve, the core also having an upwardly and outwardly flaring bowl to deflect reverse flow outwardly from the central axis.

13. In a mixing unit having a housing with a central axis, a peripheral air inlet and a mixture discharge passage with a direction of outlet flow, a fuel inlet conduit terminating inside the housing, a fuel valve adapted to close and open the fuel inlet conduit, an air valve between the air inlet and the mixture discharge passage, comprising: a pair of peripheral continuous coaxial, axially spaced-apart and axially centered stationary air valve seats in said housing, both of said air valve seats being downstream from the air inlet, a ring-shaped impermeable axially centered valve element axially movable relative to said stationary air valve seats, a pair of movable air valve seats carried by said valve element which are axially spaced apart from each other by the same spacing as said stationary air valve seats and making operative seals in pairs with said stationary air valve seats in a first position, and standing axially spaced from the respective stationary air valve seats in a second position axially spaced from the first so as to leave two annular openings from the air inlet to the mixture discharge passage between separated sets of air valve seats; a peripheral recessed wall on said valve element clearing the upstream one of said stationary valve seats when the fuel valve head is in said second position, fuel from the fuel valve seat discharging on the downstream side of said air valve.

14. A mixing unit according to claim 13 in which the housing includes a stationary core, the core bearing the downstream and radially innermost one of said stationary air valve seats and having a surface facing the air inlet and extending toward the center as it extends toward the air inlet.

15. A mixing unit according to claim 13 in which the housing includes a core forming an impermeable barrier against fuel flow to the air inlet, and discharging into the mixture discharge passage on the downstream side of said air valve.

16. A mixing unit according to claim 13 in which the housing includes a core into which the fuel from the fuel inlet conduit discharges past the fuel valve seat, the core forming an impermeable barrier against fuel flow to the air inlet, and discharging into the mixture discharge passage on the downstream side of said air valve, the core also having an upwardly and outwardly flaring bowl to deflect reverse flow outwardly from the central axis.

17. A mixing unit according to claim 13 in which the housing includes a core, the core bearing the downstream one of said stationary air valve seats and having a surface facing the air inlet and extending toward the center as it extends away from the said downstream stationary air valve seat toward the air inlet, in which the housing includes a surface which faces the mixture discharge passage and extends outwardly while it extends away from the upstream stationary air valve seat.

References Cited

UNITED STATES PATENTS

| 1,448,863 | 3/1923 | Piéree | 261—41(.4) |
|---|---|---|---|
| 2,007,337 | 7/1935 | Mallory | 261—41(.4) |
| 2,390,658 | 12/1945 | Mock | 261—69 |
| 2,544,111 | 3/1951 | Schneebeli | 261—44 |
| 2,683,028 | 7/1954 | Schneebeli | 261—50(.1)X |
| 2,788,082 | 4/1957 | Vanderpoel | 48—184UX |
| 2,925,257 | 2/1960 | Cohn | 261—72X |
| 2,983,592 | 5/1961 | Jones | 48—180X |
| 2,988,345 | 6/1961 | Kolbe et al. | 261—50(.1) |
| 3,123,451 | 3/1964 | Baverstock | 48—184 |

FOREIGN PATENTS

| 672,455 | 5/1952 | Great Britain | 261—44 |
|---|---|---|---|
| 1,251,427 | 12/1960 | France | 48—184 |

OTHER REFERENCES

German printed applicaion, 1,188,366, March 1965, Hinter mayr.

RONALD R. WEAVER, Primary Examiner

U.S. Cl. X.R.

123—119, 142; 261—41, 50, 69